(12) United States Patent
Knoedgen et al.

(10) Patent No.: US 7,948,519 B2
(45) Date of Patent: May 24, 2011

(54) INTELLIGENT LIGHT SOURCE WITH SYNCHRONIZATION WITH A DIGITAL CAMERA

(75) Inventors: Horst Knoedgen, Munich (DE); Dirk Huettmann, Baltmannsweiler (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 12/661,951

(22) Filed: Mar. 26, 2010

(65) Prior Publication Data

US 2010/0188561 A1 Jul. 29, 2010

Related U.S. Application Data

(62) Division of application No. 10/930,353, filed on Aug. 31, 2004, now Pat. No. 7,697,031.

(30) Foreign Application Priority Data

Aug. 17, 2004 (EP) ..................................... 04368056

(51) Int. Cl.
*H04N 17/00* (2006.01)
*G03B 15/02* (2006.01)
(52) U.S. Cl. .............................. 348/188; 362/5; 362/16
(58) Field of Classification Search .................. 348/187, 348/188, 370, 371; 362/5, 16, 18, 293, 317, 362/509; 356/218
See application file for complete search history.

(56) References Cited

U.S. PATENT DOCUMENTS

| 3,255,304 | A | * | 6/1966 | Dischert et al. ............... 348/187 |
| 3,858,063 | A | | 12/1974 | Saleme |
| 4,298,944 | A | | 11/1981 | Stoub et al. |
| 4,384,769 | A | * | 5/1983 | Brei et al. ...................... 353/31 |
| 4,612,666 | A | | 9/1986 | King |
| 5,179,437 | A | | 1/1993 | Kawada et al. |
| 5,467,128 | A | * | 11/1995 | Yates et al. ..................... 348/187 |

(Continued)

FOREIGN PATENT DOCUMENTS

EP 0 393 848 10/1990

(Continued)

OTHER PUBLICATIONS

"Precision Voltage-to-Current Converter/Transmitter," Burr-Brown, XP-002319985, XTR110, 1984, PD5-555D,pp. 1-9, printed USA Sep. 1993.

(Continued)

*Primary Examiner* — Victor Kostak
(74) *Attorney, Agent, or Firm* — Saile Ackerman LLC; Stephen B. Ackerman

(57) ABSTRACT

An intelligent light source for use with the test of a digital camera module provides a plurality of shapes of light. A fast light pulse is created with turn-on and turn-off transitions less than or equal to one microsecond. Other waveform shapes comprise a ramp and a sinusoid, and all shapes can be made to occur once or repetitively. The magnitude of the light has a range from 0.01 LUX to 1000 LUX, and the ramp has a ramp time that has a range from microseconds to 100 ms. The light comprises of a plurality of colors created by serial connected strings of LED devices, where the LED devices in a string emit the same color. The light emanating from the light source is calibrated using a photo diode and the control of a tester by adjusting offset voltages of a DAC controlling a current through the LED strings.

14 Claims, 7 Drawing Sheets

U.S. PATENT DOCUMENTS

| | | | |
|---|---|---|---|
| 5,649,258 A | 7/1997 | Bergstresser et al. | |
| 6,153,985 A | 11/2000 | Grossman | |
| 6,201,600 B1 | 3/2001 | Sites et al. | |
| 6,219,443 B1 | 4/2001 | Lawrence | |
| 6,473,062 B1 | 10/2002 | Debiez et al. | |
| 6,512,587 B1 | 1/2003 | Marcus et al. | |
| 6,714,241 B2 | 3/2004 | Baer | |
| 6,798,450 B2 | 9/2004 | Baer | |
| 6,809,330 B2* | 10/2004 | Krohn et al. | 250/559.36 |
| 6,822,657 B2 | 11/2004 | Baer | |
| 7,068,302 B2 | 6/2006 | Ebenstein et al. | |
| 7,155,119 B2 | 12/2006 | Knoedgen et al. | |
| 7,158,170 B2 | 1/2007 | Gustavsson et al. | |
| 7,248,284 B2 | 7/2007 | Pierce | |
| 7,248,347 B2 | 7/2007 | Knoedgen et al. | |
| 7,265,781 B2* | 9/2007 | Noguchi | 348/223.1 |
| 7,403,229 B2 | 7/2008 | Knoedgen et al. | |
| 7,405,764 B2 | 7/2008 | Gustavsson et al. | |
| 7,426,316 B2 | 9/2008 | Vehvilainen | |
| 7,486,309 B2 | 2/2009 | Knoedgen et al. | |
| 7,505,064 B2 | 3/2009 | Knoedgen et al. | |
| 2002/0191973 A1 | 12/2002 | Hofer et al. | |
| 2003/0048375 A1 | 3/2003 | Seim | |
| 2003/0142374 A1 | 7/2003 | Silverstein | |
| 2003/0146976 A1 | 8/2003 | Liu | |
| 2004/0032496 A1* | 2/2004 | Ebenstein et al. | 348/187 |
| 2005/0219365 A1* | 10/2005 | DiCarlo et al. | 348/188 |

FOREIGN PATENT DOCUMENTS

| | | |
|---|---|---|
| EP | 0 679 932 | 11/1995 |
| EP | 1 348 996 | 10/2003 |
| JP | 02197870 | 8/1990 |
| JP | 03099376 | 4/1991 |
| JP | 2001292461 | 10/2001 |
| JP | 2002077955 | 3/2002 |
| JP | 2002232918 | 8/2002 |
| JP | 2002290994 | 10/2002 |
| JP | 2003101823 | 4/2003 |
| JP | 2003179949 | 6/2003 |
| JP | 2003219436 | 7/2003 |
| JP | 2003259126 | 9/2003 |
| WO | WO 03/096761 | 11/2003 |

OTHER PUBLICATIONS

"A pulsed light-emitting-diode system for stimulation of luminescence," by M.L. Chithambo et al., Meas. Sci. Technol. 11 (2000), pp. 418-424, XP-002319984, 2000 IOP Publishing Ltd.

* cited by examiner

INTELLIGENT LIGHT SOURCE WITH SYNCHRONIZATION WITH A DIGITAL CAMERA

This is a divisional application of U.S. patent application Ser. No. 10/930,353; filed on Aug. 31, 2004, now U.S. Pat. No. 7,697,031, which is herein incorporated by reference in its entirety and assigned to the same assignee.

RELATED PATENT APPLICATION

This application is related to U.S. patent application Ser. No. 10/930,351; filed on Aug. 31, 2004; issued Feb. 3, 2009 as U.S. Pat. No. 7,486,309; and assigned to the same assignee as the present invention.

This application is related to U.S. patent application Ser. No. 10/929,651; filed on Aug. 30, 2004; issued Mar. 17, 2009 as U.S. Pat. No. 7,505,064; and assigned to the same assignee as the present invention.

This application is related to U.S. patent application Ser. No. 10/929,652; filed on Aug. 30, 2004; issued Dec. 26, 2009 as U.S. Pat. No. 7,155,119; and assigned to the same assignee as the present invention.

This application is related to U.S. patent application Ser. No. 10/929,300; filed on Aug. 30, 2004; issued Jul. 24, 2007 as U.S. Pat. No. 7,248,347; and assigned to the same assignee as the present invention.

This application is related to U.S. patent application Ser. No. 10/929,653; filed on Aug. 30, 2004; issued Jul. 22, 2008 as U.S. Pat. No. 7,403,229; and assigned to the same assignee as the present invention.

BACKGROUND OF THE INVENTION

1. Field of Invention

The present invention is related to a light source, and in particular to an intelligent light source used to test a digital camera module that is synchronized with the digital camera module.

2. Description of Related Art

The digital camera is becoming a ubiquitous device. Not only are digital cameras replacing the traditional film camera, digital camera devices are being used in many other applications, such as small electronic devices, such as PDA (personal data assistant) and cellular phones. With the explosion of cellular phones, the ability to take a picture and then send that picture to another individual using a second cellular phone comes the need to produce inexpensive digital camera modules and efficiently test these modules in large quantities. This is further complicated by the many different module configurations that are emerging as a result of the many different application requirements, including fixed focus, manual focus and automatic focus as well as physical size. Some of these modules are very small and others have signal leads in the form of a flex filmstrip. The testing time for digital camera module, which can have mega-pixel capability, has traditionally been a relatively long process (approximately sixty seconds for a module with 0.3 megapixels) to insure the integrity and picture quality of the camera. Quality testing at a low cost has become the utmost of importance. This necessitates a testing capability that is fast and insures the integrity and specification of the digital camera module while testing a large quantity of modules.

A patent application Ser. No. 10/417,317 dated Apr. 16, 2003, is related to miniature cameras and their manufacturing methods that are used as built-in modules in hand held consumer electronics devices such as mobile phones and PDA's.

In a second patent application Ser. No. 10/434,743 dated May 8, 2003, a test system is described for digital camera modules used as built-in modules for consumer electronics, which performs electrical tests, adjustment of focus and sealing of the lens barrel with glue.

In addition there are a number of other prior art patents that are directed to testing of digital cameras: US 20040032496A1 (Eberstein et al.) is directed to a method of camera calibration and quality testing; EP 1389878A1 (Bednarz et al.) is directed to a method of camera calibration and testing camera quality; US 20040027456A1 (Pierce) directed to the use of calibration targets; EP 1382194A1 (Baer) is directed to dark current subtraction; JP 2003259126 (Keisuke) is directed to removing noise of an image; US 20030146976A1 (Liu) is directed to a digital camera system enabling remote monitoring; JP 2003219436 (Fuminori) is directed to adjustment of a pixel shift camera; US 2003142374 (Silverstein) is directed to calibrating output of an image output device; JP 2003179949 (Hidetoshi) is directed to a luminance level inspection apparatus; JP 2003157425 (Vehvilainen) is directed to improving image quality produced in a mobile imaging phone; JP 2003101823 (Kenichi) is directed to specifying a picture data area; EP 1286553 A2 (Baer) is directed to a method and apparatus for improving image quality; US 20030030648 (Baer) is directed to a method and apparatus for improving image quality in digital cameras; U.S. Pat. No. 6,512,587 (Marcus et al.) is directed to measurement method and apparatus of an imager assembly; US 20030002749 (Vehvilainen) is directed to a method and apparatus for improving image quality; US 20020191973 A1 (Hofer et al.) is directed to a method and apparatus for focus error reduction; WO 2002102060 A1 (Baer) is directed to a method and apparatus for smear in digital images using a frame transfer sensor; JP 2002290994 (Hidetoshi) is directed to a method and apparatus to detect foreign matter on the surface of a lens; JP 200223918 (Yanshinao) is directed to an image inspection device and method for a camera module; JP 2002077955 (Keisuke) is directed to a method and apparatus for evaluating camera characteristics; JP 2001292461 (Keisuke) is directed to a system and method for evaluating a camera; U.S. Pat. No. 6,219,443 B1 (Lawrence) is directed to a method and apparatus for inspecting a display using a low resolution camera; U.S. Pat. No. 6,201,600B1 (Sites et al.) is directed to a method and apparatus for inspection of optically transmissive objects having a lens; U.S. Pat. No. 5,649,258 (Bergstresser et al.) is directed to an apparatus and testing of a camera; EP 0679932 B1 (Kobayashi et al.) is directed to testing an electronically controlled camera; U.S. Pat. No. 5,179,437 (Kawada et al.) is directed to an apparatus for color correction of image signals of a color television camera; JP 03099376 (Hiroshi) is directed to the quality of a display screen; U.S. Pat. No. 4,612,666 (King) is directed to a pattern recognition apparatus; and U.S. Pat. No. 4,298,944 Stoub et al.) is directed to a method and apparatus for distortion correction for scintillation cameras.

SUMMARY OF THE INVENTION

It is an objective of the present invention to produce a light source in which a pulse of light has a controlled intensity and rise and fall times that are less than a microsecond.

It is also an objective of the present invention to produce a magnitude of the light source ranging from 0.01 LUX to 1000 LUX.

It is also an objective of the present invention to synchronize a light pulse with a digital camera module under test.

It is still an objective of the present invention to control the light pulse as a single pulse or a repetitive pulse.

It is further an objective of the present invention to vary the shape and intensity of the light source comprising a ramp of light and a sinusoidal shaped light.

It is further an objective of the present invention to produce a ramp with a ramp time ranging from microseconds to 100 ms.

It is still further an objective of the present invention to produce a light source with a plurality of colors each being controlled for intensity, light shape and repetition.

It is also still further an objective of the present invention to provide calibration for each color in the light source.

In the present invention a light source is controlled by a tester for the purpose of testing a digital camera module. The light source is configured from a plurality of serially connected strings of LED (light emitting diodes) devices, each of which produces a light color. There is a plurality of LED strings producing a plurality of colors comprising red, blue, green and infrared. Each LED string produces a different color, and each of the LED strings is powered separately by a current source driven by a DAC (digital to analog converter). The light emanating from the LED strings can be turned on and turned off rapidly with a turn on transition and a turn off transition of 1 us or faster. Different pulse shapes are produced comprising a sinusoidal varying light and a light in which the turn-on transition is a ramp of variable length of time. The ramp time is controlled in a plurality of time range than have a maximum ramp time of 100 us, 1 ms, 10 ms and 100 ms. The amplitude of the light source is controlled in a plurality of ranges where, for example, the maximum comprise 10 LUX, 100 LUX and 1000 LUX, and the light from the light source can be made to be repetitive or only one pulse.

A tester provides controls for selecting color, intensity, shape and repetitiveness of the light pulse. Within the tester is a frame grabber function, which synchronizes the light source with a clock of a digital camera under test (MUT). When the light source is turned on, the MUT captures a digital image of the light, and the frame grabber couples the image into a memory of a computational unit within the tester for analysis.

Data for controlling the DAC is loaded into a data memory (1K×16 bits) and is coupled to a 12-bit DAC under the control of a controller. The controller comprises a FPGA (field programmable gate array), which allows for easy upgrading of the controller operation. The data in the data memory is used to control the light source and is coupled to the DAC, which feeds a V/I converter (voltage to current converter). The V/I converter pulls a current through a selected string of LED devices that turns the resulting light on. The current is controlled such as to produce a fast on-off light pulse or a light having a defined shape, e.g. sinusoidal, ramp or stair step. A particular light shape or pulse can be set to be repetitive.

A photo diode is used to calibrate the light source and maintain a consistency between the strings of LCD devices that produce the different colors of light. The photo diode signal is coupled to an ADC (analog to digital converter), which couples a digital value of the photo diode signal to the tester. The DAC that controls the current source (V/I converter) for a particular LED string is then adjusted to maintain a similar light intensity between the LED strings that produce the different colors of light. This calibration capability also allows for adjustments resulting from aging of the LED diodes and maintains consistency between the different colors of light produced by the LED strings.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
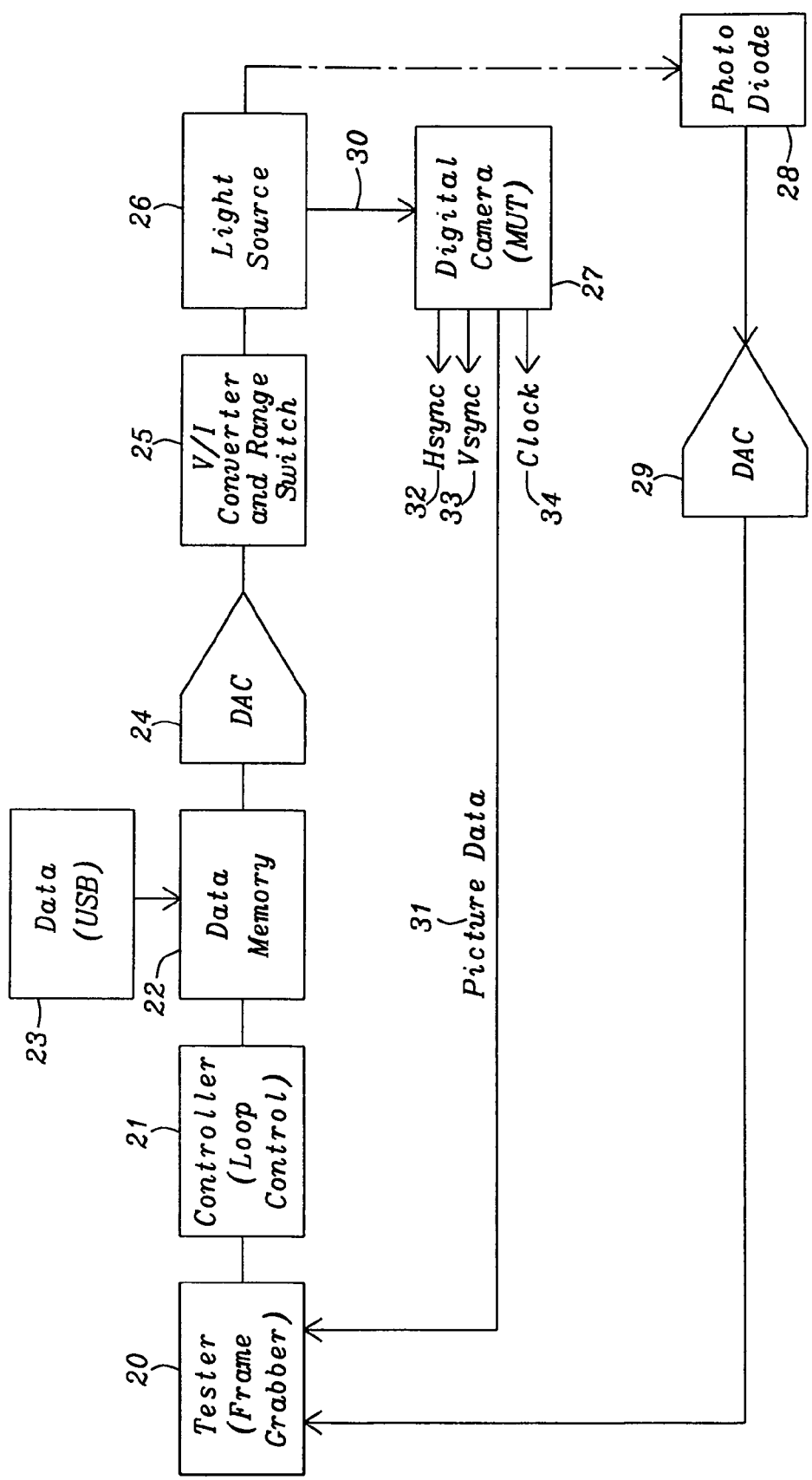
FIG. 1 is a block diagram of the control of the light source of the present invention.

In FIG. 1 is shown is a block diagram of the present invention showing the control of a light source 26. The light source 26 is contained in a test station used to test a digital camera module (MUT) 27. A tester 20 provides control to a controller 21 and the tester 20 receives back digital picture data from the MUT 27. The controller comprises a FPGA (field programmable gate array), which allows easy reconfiguration of the control of the light source and provides loop control to produce repetitive light waveforms. The controller 21 controls a data memory 22 containing the data (16-bits×1K) necessary to control the output of the DAC 24 coupled to the V/I converter and range switch 25. Data used to control the DAC is loaded into the memory 22 from an USB bus 23.

The DAC is a 12-bit digital to analog converter that controls the V/I converter and range switch 25 to provide a current to turn-on the light source 26. The V/I converter 25 has a current capacity that allows a full-scale light output of the light source for a plurality of light intensity ranges comprising 1000 LUX, 100 LUX and 10 LUX. Each range of light is driven with a 12-bit resolution of the DAC 24. The 12-bit resolution of the DAC allows the creation of a light intensity of 0.01 LUX in the 10 LUX range. The range switch in the V/I converter 25 allows a plurality of maximum range of currents to be produced by the V/I converter 25, comprising currents of approximately 50 ma, 20 ma, 2 ma and 200 ua. The maximum current of 50 ma is dependent only upon the LED devices, which make up the light source; therefore the maximum current is established by the LED device used. The light source is switched on and off by the V/I converter with a rise and the fall time of the light emanating from the light source of approximately 1 us or faster.

Continuing to refer to FIG. 1, the V/I converter and range switch 25 drives the light source 26, which comprises a plurality of serial connected strings of LED devices. Each serial connected string of LED devices produces a different light color comprising red, blue, green and infrared. There are spare strings of LED devices that can be used to repeat the colors used in the light source, or provide additional light colors. A separate DAC 24 and V/I converter 25 drives each LED device string. Any combination of LED device strings can be turned-on, and off, by a plurality of DAC and V/I converters simultaneously. The light source produces a light 30 that is received by a photo diode 28 for the purpose of calibrating the light 30 and maintaining the calibration throughout the life of the LED devices. The calibration includes setting and maintaining the light intensity between the various colors produced by the LED device string for the various light ranges, 1000 LUX, 100 LUX and 10 LUX.

Continuing to refer to FIG. 1, a frame grabber function within the tester 20 synchronizes the light from the light source 26 with the clock of the MUT 27 so that the MUT can capture a digital image of the light 30 that is being turned on and off rapidly by the DAC 24 and the V/I converter 25. The MUT 27 provides picture data 31, an Hsync signal 32, a Vsync signal 33 and a clock signal 34 to the tester 20 for use by the frame grabber. The picture data 31, which is a digital image of the picture taken by the MUT 27, is stored in a memory of the computation unit of the test system by the frame grabber. The Hsync signal is the horizontal synchronization signal of the digital image from the MUT 27, which allows scanning out of the picture data by pixel row, and the Vsync signal 33 is the vertical synchronization signal, which allows the picture data to be scanned out by pixel column. The clock 34 is an internal clock of the MUT 27 that is synchronized with the turning on of the light source to allow capture of an image of the light. The frame grabber in the test system 20 synchronizes the turning on of light source 26 with the clock of the MUT 27 to allow a picture of the light of narrow time duration emanating from the light source to be captured by the MUT.

Figure 2:
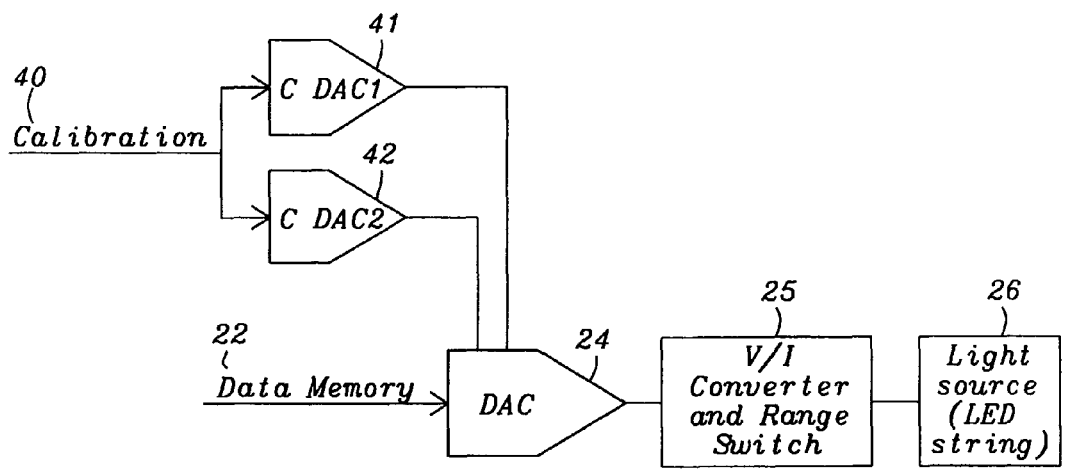
FIG. 2 is a diagram of the DAC controlling V/I converter of the present invention with attached calibration DAC converters.

In FIG. 2 is shown calibration digital to analog converters, CDAC1 (41) and CDAC2 (42) that are used to calibrate the DAC 24, which is used to drive the V/I converter and range switch 25 to provide current to turn on a light color from a serial connected string of LED devices within the light source 26. A calibration signal 40 is provided by the tester 20 (FIG. 1). The calibration signal 40 is derived from a measurement by the photo diode 28 and a controlled adjustment by the tester to provide a same calibrated intensity of light for each color. Each color string of LED devices is controlled by a separate combination of a DAC 24 connected to a V/I converter and range switch 25. The calibration CDAC1 adjusts the DAC 24 to calibrate the maximum value of a range of light intensity and the CDAC2 adjusts DAC 24 to calibrate the minimum value of a range of light intensity. There are four intensity ranges and two calibration digital to analog converters CDAC1 (41) and CDAC2 (42) for each color and each range of light within a color produced by the light source. Each color comprising a string of LED devices is coupled to a separate combination of the DAC 24 and V/I converter 25 resulting in eight calibration digital to analog converters connected to the DAC 24 for each color. An alternative to using calibration digital to analog converters is to perform a software calibration and storing the calibration values in memory.

Figure 3:
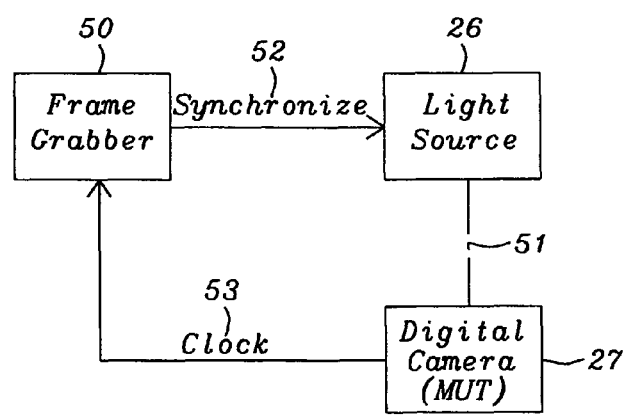
FIG. 3 is a block diagram of the present invention showing the relationship of the frame grabber, the light source and the digital camera under test.

In FIG. 3 is shown a block diagram of the present invention showing the interaction of the frame grabber 50 with the light source 26 and the MUT 27. When a picture is to be taken with the MUT 27, the frame grabber 50 synchronizes 52 the turning on of the light source 26 with the clock of the digital camera MUT, which takes the picture of the light 51 emanating from the light source 26. The speed at which the light 51 from the light source 26 is turned on and off (microseconds) requires that the MUT 27 and the light source 26 be synchronized in order to obtain a valid picture.

Figure 4:
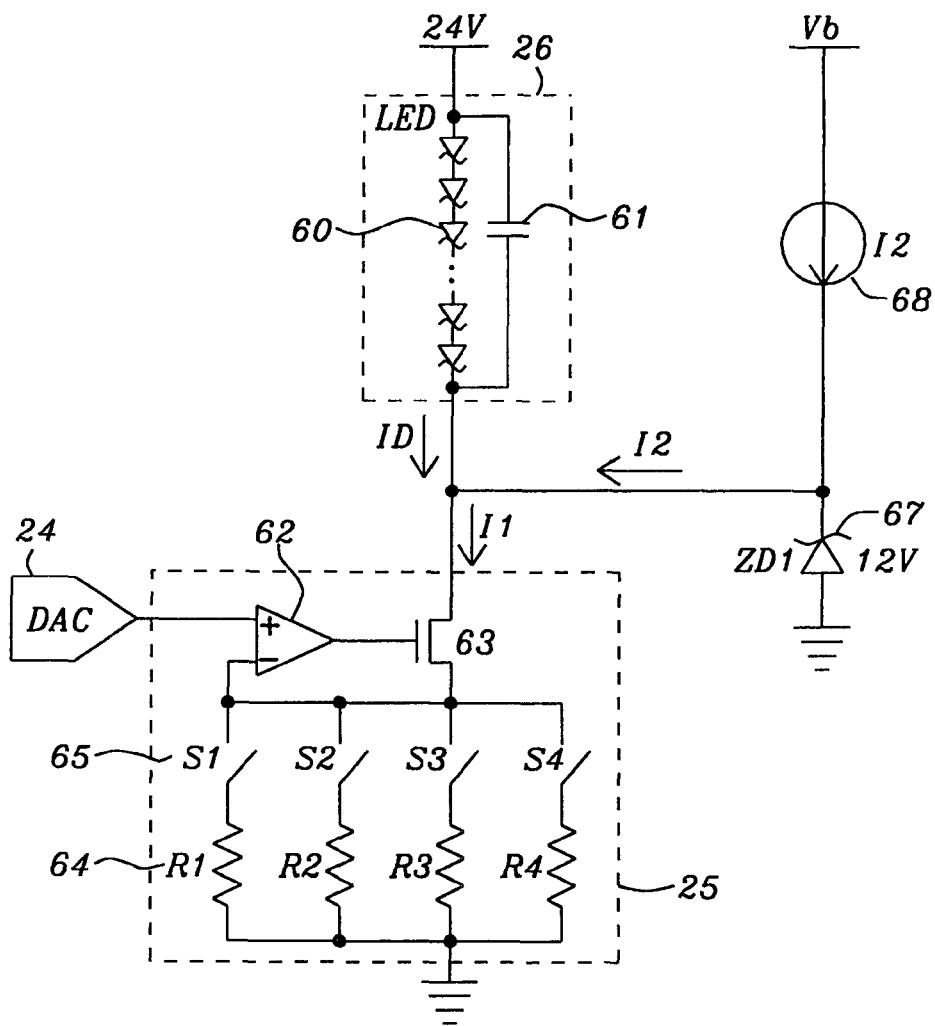
FIG. 4 is a schematic diagram of the present invention showing the current source that controls the light emanating from an LED string.

In FIG. 4 is shown a schematic diagram of the circuitry used to turn on and off a serial connected string of LED devices 60 producing a single color of light. A DAC 24 is coupled to a positive input of a differential amplifier 62 within the V/I converter 25 producing a current I1. The differential amplifier 62 is connected in a current follower mode, where the voltage applied to the differential amplifier 62 by the DAC 24 is developed across a resistor R1 64 when switch S1 65 is closed. The differential amplifier 62 controls the transistor device 63 to conduct a current I1 until the voltage across R1 64 approximately equals the output voltage of the DAC 24 and creating a first range of current. Similarly when switch S2 is closed (S1, S3 and S4 open), the voltage across R2 causes a second range of current, when S3 is closed (S1, S2 and S4 open) the voltage across R3 causes a third range of current, and when S4 is closed (S1, S2 and S3 open), the voltage across R4 causes a fourth range of current.

Continuing to refer to FIG. 4, the resulting current I1 is pulled from a second current source 62 biased to a voltage Vb, which produces a current I2, and the current ID through the string of LED devices 60, such that I1=I2+ID. The magnitude of the current ID determines the intensity of light emanating from the LED devices 60. The serial connected string of LED devices 60 is biased with approximately 24V and is shunted by a capacitor 61 to allow a quick discharge of current flowing through the LED devices 60 when the light is turned off. A Zener diode ZD1 clamps the voltage of node N1 to approximately 12 volts to prevent saturation and provide a path for the current I2 when I1 is turned off. The purpose of the current I2 from the current source 68 is to force the string of LED devices 60 to quickly and completely turn off by starving the LED devices 60 from a source of current from parasitic impedances and the V/I converter 25.

Figure 5A:
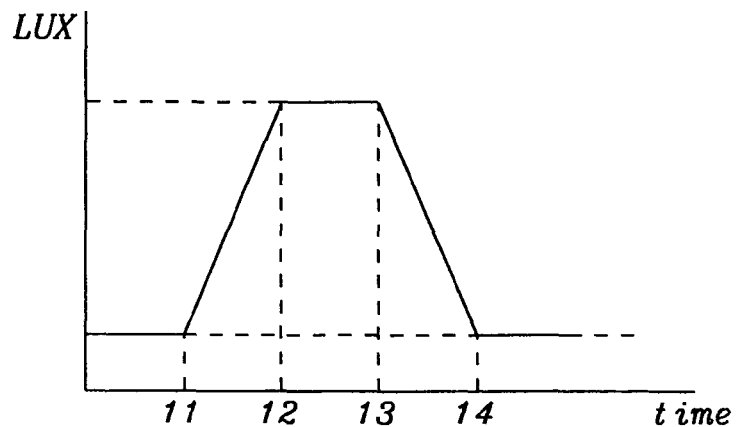
FIG. 5A through 5G are waveform diagrams of light produced by an LED string of the present invention.
Figure 5B:
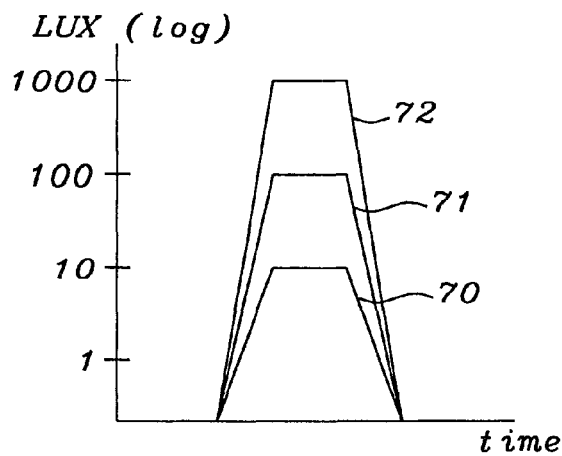

In FIG. 5A through 5G are shown various light waveforms produce by the present invention. In FIG. 5A is shown a fast light pulse produced by the circuitry in FIG. 4 in terms of LUX versus time, where a LUX is a unit of illumination equal to one lumen (a unit of light) per square meter. The rise time of the light pulse is t2−t1 [1 us, and the fall time is t4−t3 [1 us. The steady state time of the light pulse is t3−t4μ 0, and is dependent upon the requirements of the test being performed. FIG. 5B shows the range of the amplitude of light measured in LUX that is produced by the circuitry of FIG. 4. Each of the light pulses 70, 71 and 72 has a rise time and a fall time of [1 us. In the lowest range, a light pulse 70 has a full-scale value is 10 LUX. Using the 12-bit DAC shown in FIG. 4, a resolution of 0.01 LUX can be attained. The medium range light pulse 71 has a full-scale value of 100 LUX and the highest range light pulse 72 has a full-scale value of 1000 LUX. Any light amplitude can be chosen within each range 70, 71 and 72 between the maximum and minimum value of the range.

Figure 5C:
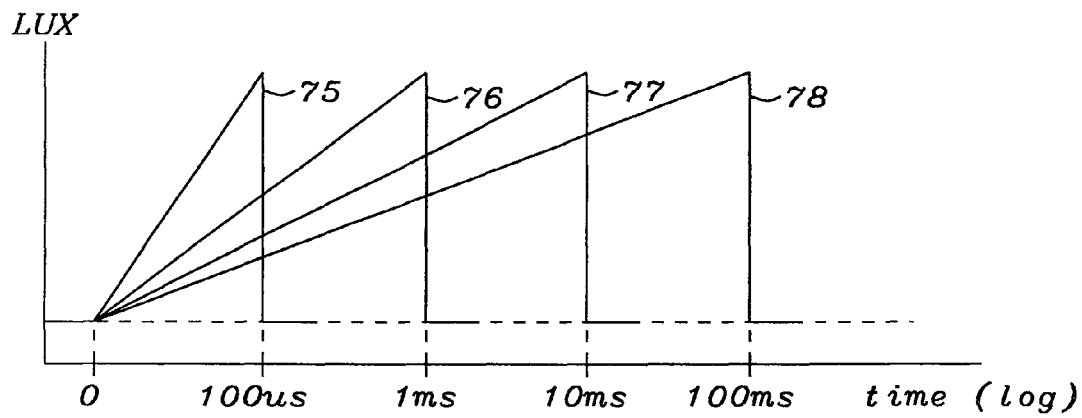

In FIG. 5C is shown four linear light ramps 75, 76, 77, and 78. The ramp-time of the ramp with the shortest ramp 75 ranges from approximately 10 us to 100 us. The ramp-time of the longest ramp 78 ranges from 10 ms to 100 ms, and there are two intermediate ramps 76 and 77 having a ramp time range of 100 us to 1 ms and 1 ms to 10 ms, respectively. Any ramp time that falls within the ramps 75, 76, 77, and 78 can be created with the circuitry shown in FIG. 4.

Figure 5D:
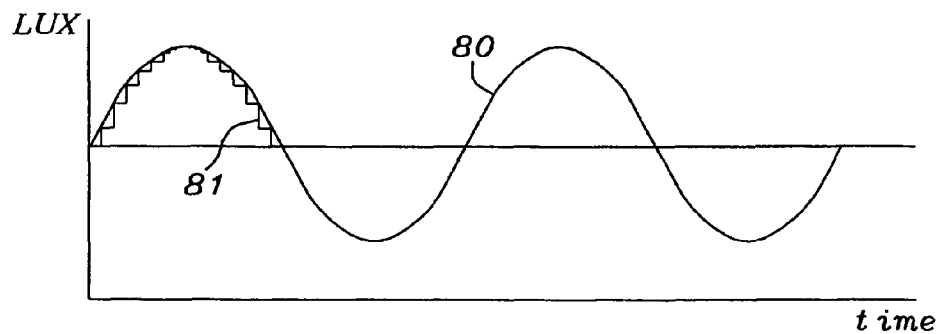

In FIG. 5D is a sinusoidal shaped light waveform 80. This sinusoidal waveform can be approximated by a light waveform of small steps 81. As the step size is reduced, the waveform of the light will approach the ideal shape of the sinusoidal waveform 80. The average value La of the sinusoidal shaped light and the maximum value Lm can be chosen such that the light emanating from a string of LED devices in the light source 26 never turns off or turns off during a portion of the sinusoidal waveform.

Figure 5E:
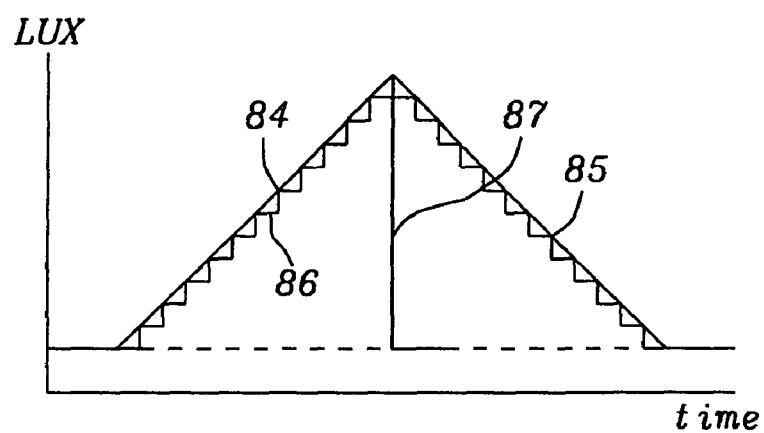

In FIG. 5E is a light waveform, which has a raising ramp 84 and a falling ramp 85. Similar to the approximation of the sinusoid in FIG. 5D, the ramps 84 and 85 can be approximate by a series of steps controlled by the DAC 24 and V/I converter 25 shown in FIG. 4. The falling ramp can be replaced by a fast turn-off transition 87 forming a ramped light pulse similar to those shown in FIG. 5C. Similar the approximation of the sinusoid using small light steps, the ideal ramp shape can be approached as the steps 86 become smaller. The ramps cannot become any faster than the transition time of a light pulse rise and fall time shown in FIG. 5A.

Figure 5F:
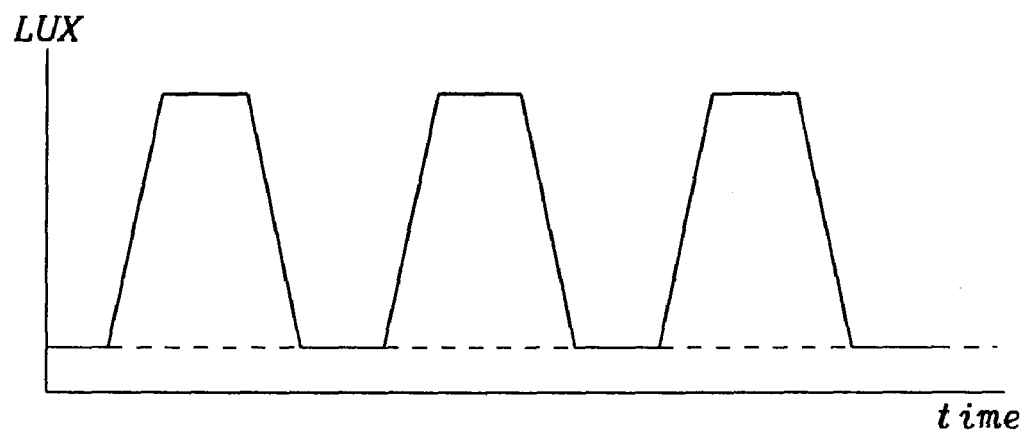
Figure 5G:
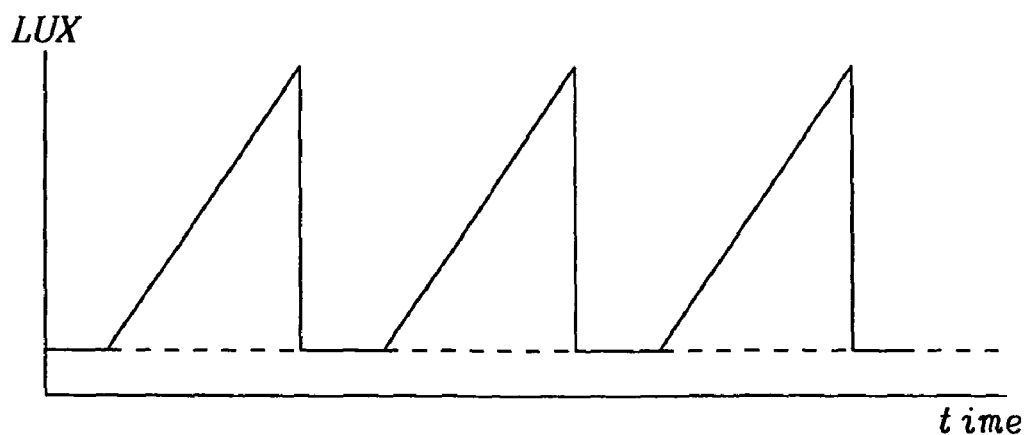

In FIG. 5F is show a repetitive light waveform using the light pulses of FIG. 5A. The length of the repetitive waveform can be any length that can be accommodated by the total allowable test time of the MUT. Similar to the repetitive waveform of the light pulses shown in FIG. 5 F, a repetitive light waveform of ramps of light is shown in FIG. 5G. These repetitive light waveforms can be of any light amplitude and time length that can be accommodated by the circuitry of FIG. 4. However, there is no fundamental limit to the shape and sizes of the light waveforms presented in FIGS. 5A, 5B, 5C, 5D, 5E, 5F and 5G exclusive of the laws of physics and the requirements of the particular circuitry used to produce the light for use in the test of the digital camera module of the present invention.

Figure 6:
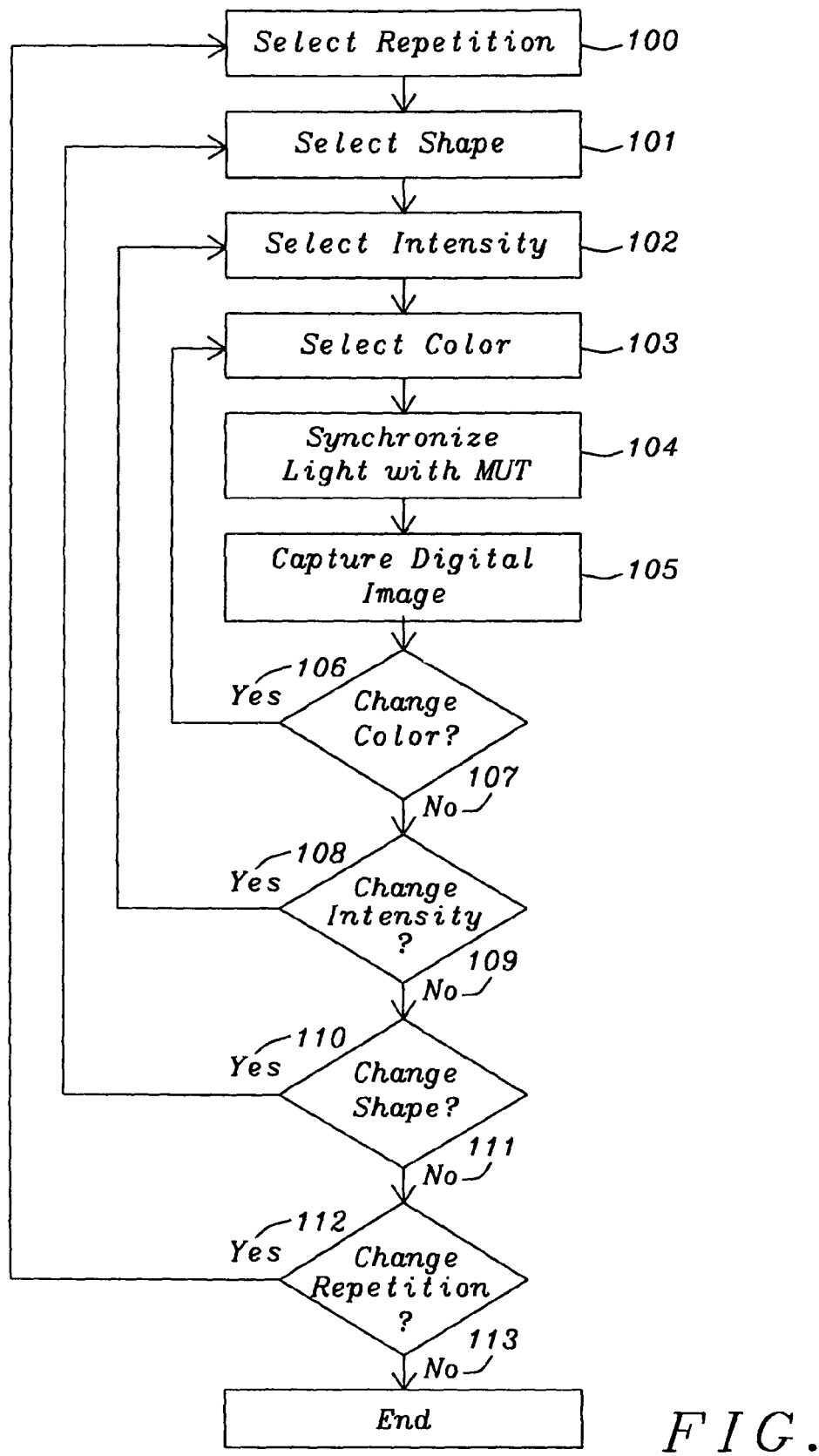
FIG. 6 is a flow diagram of the present invention for setup and control of light from an LED string.

In FIG. 6 is shown a flow diagram of the control of a light pulse and waveform produce by the present invention. The repetition of the light is selected 100 by the controller 21 (FIG. 1), which selects a single shape of light or a light waveform repeating that shape for a plurality of cycles. The shape of the light is selected 101, which comprises a pulse with fast rise and fall times, and a ramp and a sinusoid or stepped approximations thereof. The shape of the light is controlled by data stored in the data memory 22 (FIG. 1). The intensity of light, measured in LUX, is set for each color of light to be selected 102. The intensity can range from a maximum of approximately 1000 LUX to approximately the finest resolution, 0.01 LUX, of the lowest intensity range and is controlled by the amount of current coupled by the voltage to current converter 25 to a serial connected string of LED devices in the light source 26 (FIG. 1). A light color is selected 103, which selects one or any combination of serial connected strings of LED devices contained within the light source 26. Each individual string of LED devices is separately powered from a voltage to current converter 25 and each individual string of LED devices provides a light of a same color, comprising the colors of red, blue, green and infrared. A selection of a combination of a plurality of LED device strings will produce a composite light having a composite color of the selected LED device strings.

Continuing to refer to FIG. 6, the light source is synchronized with the clock of the digital camera module under test (MUT) 104 using a frame grabber function within the tester. This allows the MUT to capture a digital image 105 of the light, which is turned on and off in microseconds, and transfer the captured digital image to a computational unit in the tester. If a change in light color is required, then a next light color is selected 106, and the subsequent process steps 103 through 106 are repeated. If no color change is required 107, a next intensity setting of the light is selected 108, and the subsequent process steps 102 through 108 are repeated. If no additional change in light intensity is required 109 and if a light shape change is required 110, a next light shape is selected 101 and the subsequent process steps 101 through 110 are repeated. If no additional shape change 111 is required and if the repetition of a particular light set up is required to be changed for the next test of the MUT, a next repetition is selected 112 and the subsequent process steps 100 through 112 are repeated. If the no additional repetition is required of the particular light set up 113, the process ends, It should be noted that repetition as used here relates to the selection of a single pulse or a repetition of a single pulse, where the single pulse is a fast pulse (FIG. 5A), a ramp (FIGS. 5C and 5E), and a sinusoid (FIG. 5D), and the repetition of a single pulse is shown in FIGS. 5D, 5F and 5G.

Figure 7:
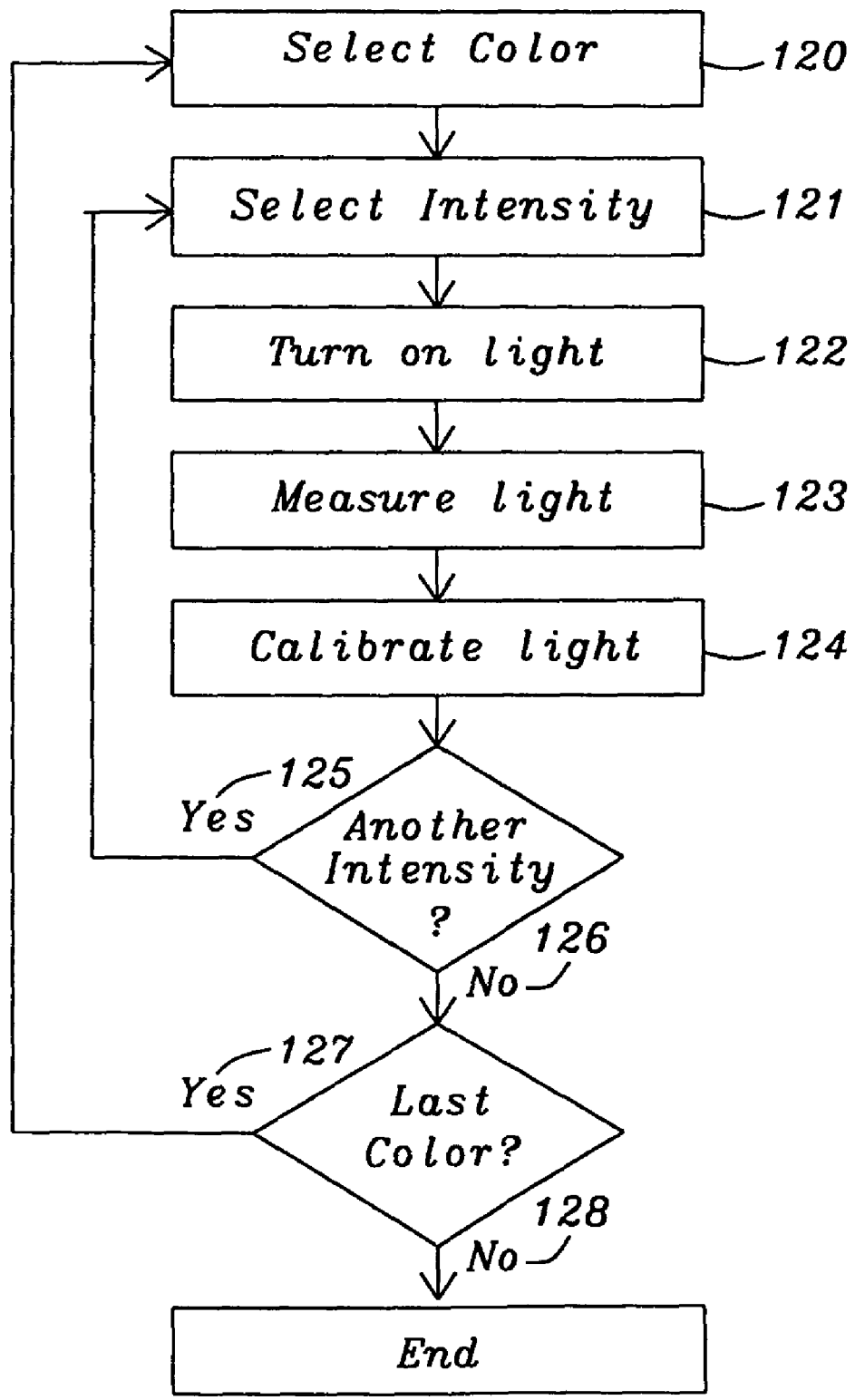
FIG. 7 is a flow diagram of the present invention for the calibration of light emanating from an LED string.

In FIG. 7 a process flow for the calibration of the light source of the present invention is shown. A light color is selected 120, which selects a serial connected string of LED devices, where all LED devices in the selected string produce the same color of light. A light intensity of the selected string of LED devices is selected 121 and the light of the selected string is turned on 122 by pulling a current through the serial connected LED devices using the voltage to current converter 25 (FIG. 1). The light emanating from the LED string is measured 123 using a photo diode and the light is calibrated 104 by adjusting the current flowing through the LED string until the photo diode measures a predetermined calibrated value. The calibration digital to analog converters, CDAC1 and the CDAC2 (FIG. 2), under the control of the tester 20 (FIG. 1) are used to adjust the DAC 24 (FIG. 2) until the photo diode measures the predetermined calibration value. If the calibration of another light intensity of the same color of light is required 125, the next intensity of light is selected 121 and the subsequent process steps 122 through 125 are repeated. If no additional light intensity settings for the light color are required and if the last light color has not been calibrated 127, a next light color is selected 120 and subsequent process steps 121 through 127 are repeated. If the last light color has been calibrated 128, the process ends.

While the invention has been particularly shown and described with reference to preferred embodiments thereof, it will be understood by those skilled in the art that various changes in form and details may be made without departing from the spirit and scope of the invention.

What is claimed is:

1. A method for applying a defined light to a light sensitive device, comprising:
    a) selecting a single occurrence or repetitive occurrence of a light emanating from a light source to illuminate a digital camera module under test (MUT);
    b) selecting a time varying shape of said light, wherein selecting said time varying shape of said light selects a sequence of data stored in a data memory that controls a digital to analog converter (DAC) to produce a current to control said light source;
    c) selecting an intensity of said light;
    d) selecting a color of said light;
    e) synchronizing said light with a clock of said MUT;
    f) capturing a digital image of said light with said MUT and coupling said digital image to a tester;
    g) changing said color if required and repeating steps (d) through (g), else step (h);
    h) changing said intensity of the light if required and repeating steps (c) through (h), else step (i);
    i) changing said shape of the light pulse if required and repeating steps (b) through (i), else step (j);
    j) changing said repetition if required and repeating steps (a) through (g), else step (k);
    k) ending illumination of said MUT.

2. The method of claim 1, wherein selecting said color of said light selects a serial connected string of light emitting diodes within said light source that produce said color.

3. The method of claim 2, wherein selecting said intensity of said light selects a range and magnitude of said current connected to said selected serial connected string of light emitting diodes to produce said light.

4. The method of claim 3, wherein said intensity of said light ranges from approximately 0.01 LUX to approximately 1000 LUX.

5. The method of claim 3, wherein selecting said time varying shape of said light selects a sequence of data stored in a data memory that controls said DAC that drives a voltage to current converter to produce said current.

6. The method of claim 5, wherein selecting said repetition of said time varying shape of the light selects a controller to control said data memory to repeat the selection of the sequence of data connected to said DAC.

7. The method of claim 1, wherein synchronizing said light with said clock of said MUT allows said single occurrence of said light to be captured by said MUT.

8. The method of claim 7, wherein synchronizing said light is controlled by a frame grabber function within said tester.

9. The method of claim 1, wherein coupling said digital image to the tester is controlled by a frame grabber that stores said digital image into a computational memory in said tester.

10. The method of claim 1, wherein said light is a light pulse.

11. The method of claim 10, wherein said light pulse has a rise time and a fall time of approximately one microsecond or faster.

12. The method of claim 1, wherein said light is a ramp.

13. The method of claim 12, wherein said ramp has a range of length in time as short as approximately ten microseconds and as long as approximately one hundred milliseconds.

14. The method of claim 1, wherein said light has a sinusoidal time varying shape.

* * * * *